US008531293B2

(12) United States Patent
Putz

(10) Patent No.: US 8,531,293 B2
(45) Date of Patent: Sep. 10, 2013

(54) PREDICTIVE GEOFENCE CROSSING

(75) Inventor: Jason T. Putz, St. Louis, MO (US)

(73) Assignee: Lockheed Martin Corporation, Bethesda, MD (US)

( * ) Notice: Subject to any disclaimer, the term of this patent is extended or adjusted under 35 U.S.C. 154(b) by 448 days.

(21) Appl. No.: 12/908,293

(22) Filed: Oct. 20, 2010

(65) Prior Publication Data

US 2011/0148634 A1 Jun. 23, 2011

Related U.S. Application Data

(60) Provisional application No. 61/282,150, filed on Dec. 23, 2009.

(51) Int. Cl.
*G08B 13/00* (2006.01)
*B60Q 1/00* (2006.01)
*G08G 1/123* (2006.01)
*G01C 22/00* (2006.01)

(52) U.S. Cl.
USPC ........... 340/541; 340/435; 340/945; 340/988; 340/994; 701/23; 701/408; 701/465; 701/466; 701/467; 701/468; 701/301; 701/302

(58) Field of Classification Search
None
See application file for complete search history.

(56) References Cited

U.S. PATENT DOCUMENTS 4,646,244 A * 2/1987 Bateman et al. .............. 701/301
6,889,124 B2 * 5/2005 Block et al. ....................... 701/9
7,164,986 B2 1/2007 Humphries et al.
7,277,015 B1 10/2007 Morhard et al.
7,327,250 B2 2/2008 Harvey
7,385,499 B2 6/2008 Horton et al.
7,492,315 B2 2/2009 Verechtchiagine
7,795,566 B2 * 9/2010 Koenig ........................ 244/3.15
8,185,296 B2 * 5/2012 Yokoyama et al. ........... 701/117
8,380,424 B2 * 2/2013 Bushnell ....................... 701/122
2006/0030333 A1 2/2006 Ward et al.
2006/0293842 A1 12/2006 Casino
2007/0115101 A1 5/2007 Creekbaum et al.
2007/0182628 A1 8/2007 Pomerantz et al.
2007/0185728 A1 8/2007 Schwarz et al.
2007/0262861 A1 11/2007 Anderson et al.
2008/0129490 A1 6/2008 Linville et al.
2008/0129491 A1 6/2008 Ruperto
2008/0164984 A1 7/2008 Sheffer
2008/0174485 A1 7/2008 Carani et al.
2008/0234935 A1 9/2008 Wolf et al.
2008/0238769 A1 10/2008 Verechtchiagine
2009/0088972 A1 * 4/2009 Bushnell ....................... 701/210
2009/0140886 A1 * 6/2009 Bender ......................... 340/988
2009/0150070 A1 6/2009 Alewine et al.
2011/0153143 A1 * 6/2011 O'Neil et al. ................... 701/29
2012/0209457 A1 * 8/2012 Bushnell ......................... 701/13

* cited by examiner

*Primary Examiner* — Julie Lieu
(74) *Attorney, Agent, or Firm* — Oblon, Spivak, McClelland, Maier & Neustadt, L.L.P.

(57) ABSTRACT

A predictive geofence system predicts a geofence crossing for a distance-horizon and/or a time-horizon. The predictive geofence system includes a predictive geofence platform that predicts future positions of objects, and generates an alert if the predicted future positions of the objects result in a geofence crossing or the predicted future positions cross a geofence in less than a set time.

17 Claims, 10 Drawing Sheets

800

| | TARGET | CONTENT | TASK | SPATIAL INFORMATION | ••• | CONTACT |
|---|---|---|---|---|---|---|
| 1 | CONVEYANCE 202 | HAZMAT | GEOFENCE CROSSING | LAT.; LONG. | ••• | ALERT 6 |
| 2 | HIJACK FT 325 | PEOPLE & FUEL | NATIONAL SECURITY 1 | LAT.; LONG.; ALT. | ••• | ALERT 5 |
| 3 | PARADE 5 | ACTIVIST | PLANNED ROUTE | GEOFENCE 1 | ••• | ALERT 2 |
| 4 | DEM. 2, 3 & 4 | PEOPLE | SEPARATION | GEOFENCE 6, 3 & 8 | ••• | POLICE |
| 5 | CONVEYANCE 576 | TOYS | ARRIVAL | LAT.; LONG. | ••• | EMAIL |
| 6 | CONVEYANCE 267 | LAWN TRACTORS | ARRIVAL | LAT.; LONG. | ••• | EMAIL |
| 7 | MEMPHIS | POPULATION | 60 MILE RADIUS | GEOFENCE 204 | ••• | ALERT 20 |
| ⋮ | | | | | | |
| N | AIRFORCE 1 | PRESIDENT | UNAUTHORIZED PLANES | GEOFENCE 0 | ••• | ALERT 0 |

FIG. 8

PREDICTIVE GEOFENCE CROSSING

INCORPORATION BY REFERENCE

This application claims the benefit of U.S. Provisional Application No. 61/282,150, "Predictive Geofence Crossing Alerts" filed on Dec. 23, 2009, including all cited references which are incorporated herein by reference in their entirety.

BACKGROUND

Using modern geographical information systems, a party may be alerted when a conveyance enters an area that should be avoided due to various reasons such as preventing hazardous material from entering a high density population area. These alerts may be used to help prevent undesirable circumstances, for example.

SUMMARY

A predictive geofence system is disclosed that predicts a geofence crossing for a specified distance-horizon or a specified time-horizon. A distance-horizon is a distance that an object is predicted to travel for a set time in the future. A geofence crossing for the object is predicted if the distance-horizon is less than a distance between the object and the geofence. A time-horizon is a time-to-crossing for a set distance. A time-horizon is the time-to-crossing of the geofence by the object.

The predictive geofence system includes a predictive geofence platform that receives information relating to spatial characteristic for objects such as position, speed of travel, direction of travel, etc. The predictive geofence platform stores the information in a database and predicts future positions of the objects based on the stored information. The future positions may be determined based on a history of past positions and/or based on map data if available. The predictive geofence platform generates an alert if the predicted future positions of the objects result in a geofence crossing, or if predicted time-to-crossings of a geofence are less than a set time.

If a geofence is moving and changing its shape, the predictive geofence platform determines a new perimeter for the geofence based on the received information. Movements of the geofence may be characterized by generating a position of a centroid for each new perimeter, and tracking a history of movements of the generated centroids. A geofence crossing may be determined by a position of a point on the geofence nearest to an object. If geofence involve two geofences, then the predictive geofence platform may determine a geofence crossing based on points on the geofences nearest to each other. The predictive geofence platform may generate predicted positions of relevant portions of the perimeter based on the centroid movements and movements of the relevant portions of the perimeter relative to the centroid.

If a geofence crossing is predicted, the predictive geofence platform generates an alert to one or more parties designated by a user or client. The client may provide a list of parties that should be alerted and the communication method used such as email, facsimile or alarm, for example. The client may also specify a more complex alert process such as a logical formula, an inference engine, an artificial neural network, etc. This more complex process may address fast moving dynamic circumstances involving security matters, for example.

BRIEF DESCRIPTION OF THE DRAWINGS

Various embodiments of this disclosure that are proposed as examples will be described in detail with reference to the following figures, wherein like numerals reference like elements, and wherein:

FIG. 8 illustrates an example list of tasks processed by the predictive geofence system;

DETAILED DESCRIPTION OF EMBODIMENTS

Figure 1:
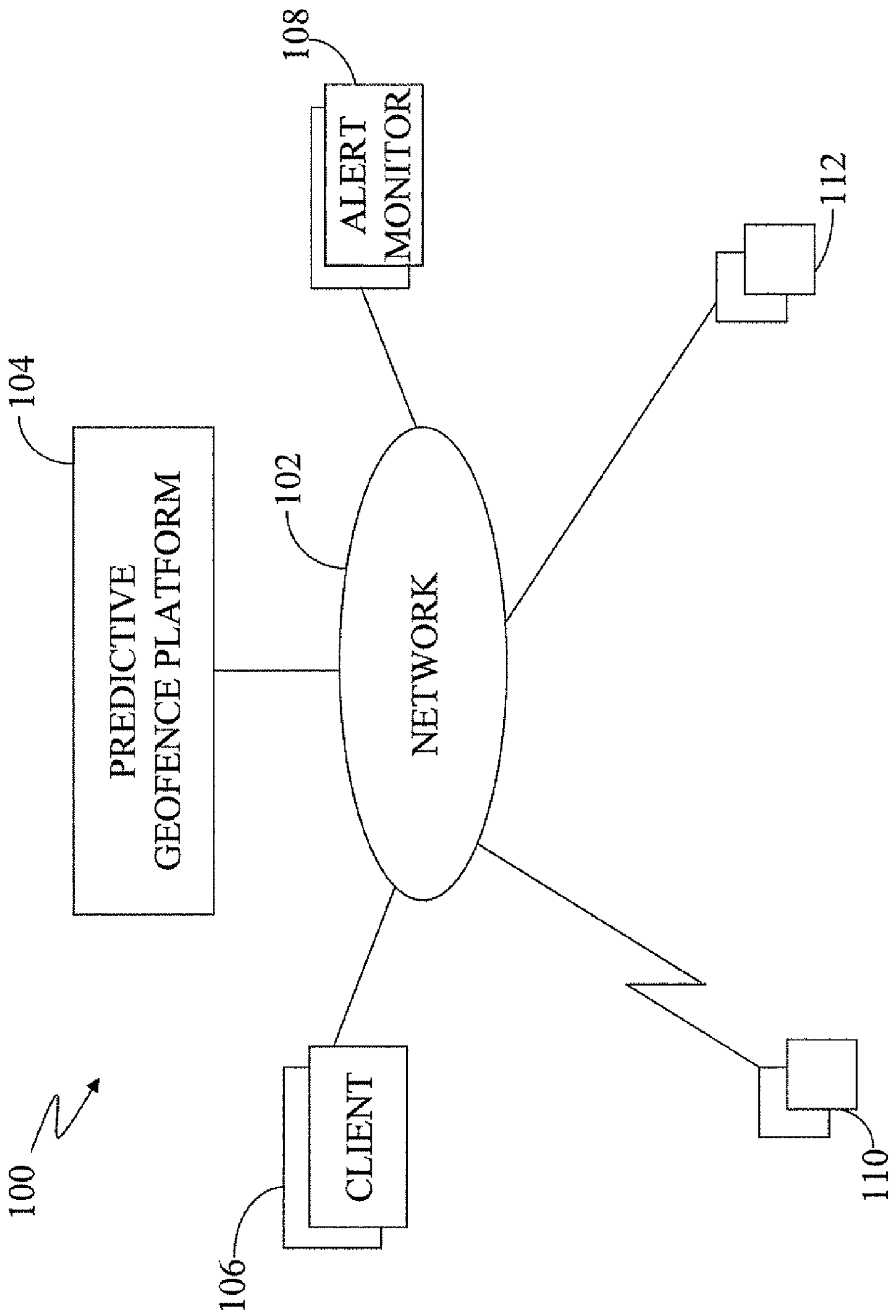
FIG. 1 illustrates a predictive geofence system.

FIG. 1 shows an exemplary diagram of a predictive geofence system 100 that includes a predictive geofence platform 104, clients 106, alert monitors 108, mobile reporting units 110 and stationary reporting units 112. Clients 106, alert monitors 108, mobile reporting units 110 and stationary reporting units 112 may be singular or plural depending on particular circumstances. These components 104-112 are connected through a network 102 that enables the components 104-112 to communicate with each other. Network 102 may be any communication system such as wired, wireless, optical, etc. and may include the Internet, private networks, peer-to-peer networks, etc.

Predictive geofence platform 104 receives information from sources such as mobile and stationary reporting units 110-112, clients 106, alert monitors 108 and/or other information providers such as the government, for example. Based on the received information, predictive geofence platform 104 establishes one or more perimeters called geofences, and generates an alert when one of mobile reporting units 110 such as a conveyance of interest is predicted to cross a geofence. Although a geofence is represented by an area perimeter in some of the examples discussed below, a geofence may be reduced to a single point representing a position of an object. Additionally, a geofence may be represented by 3 dimensional surfaces for air or under water situations.

A conveyance may be a tractor trailer, a truck, a train, etc. for moving cargo on land; air planes, balloons, air-ships, etc. are conveyances for air; ships or boats are conveyance for water surfaces; and submarines are for under water conveyances. In general, a conveyance is a shipping platform in any particular medium of travel including space travel.

Clients 106 are parties that desire to know when an object such as a conveyance is predicted to cross a geofence. For example, a government organization such as the Department of Homeland Security (DHS) may be interested in protecting one or more sites from certain materials. A site may be a high population concentration area such as a large city, and DHS desires to keep hazardous materials from coming within a certain distance such as a 100 miles of the site.

A conveyance of these hazardous materials may have a General Packet Radio Service (GPRS)/Global Positioning System (GPS) tag. The GPRS/GPS tag may be configured to periodically transmit a message that contains position information such as latitude and longitude. Other information such as speed, direction, acceleration, content identification, etc. may also be transmitted. In addition to the GPRS/GPS tag, the conveyance may include a device such as a transponder, for example, that relays similar information to stationary reporting units 112 that are placed along the road and/or at strategic places such as weighing stations. The information may be generated as electronic data interchange (EDI) information, for example. The information relating to a conveyance may also be generated by a person who observes arrival and/departure times and/or locations, and reports this information to predictive geofence platform 104. Devices such as cell phones, satellite tags, truck in-cab computers, etc. may also be used to report this information.

Predictive geofence platform 104 receives the information either directly or through other sources such as clients 106 or alert monitors 108, and predicts a distance-horizon for T time into the future specified by client 106, for example, to determine whether the conveyance will cross a geofence in T time. Predictive geofence platform 104 may also predict a time-horizon for D distance to be traveled in the future. If D is the distance between the object and the geofence, then the time-horizon is the time-to-crossing of the geofence by the object. A geofence crossing for an object is predicted if the distance-horizon is greater than a distance between the object and the geofence. A geofence crossing is also predicted if the time-horizon is less than a set time specified by client 106, for example.

Figure 2:
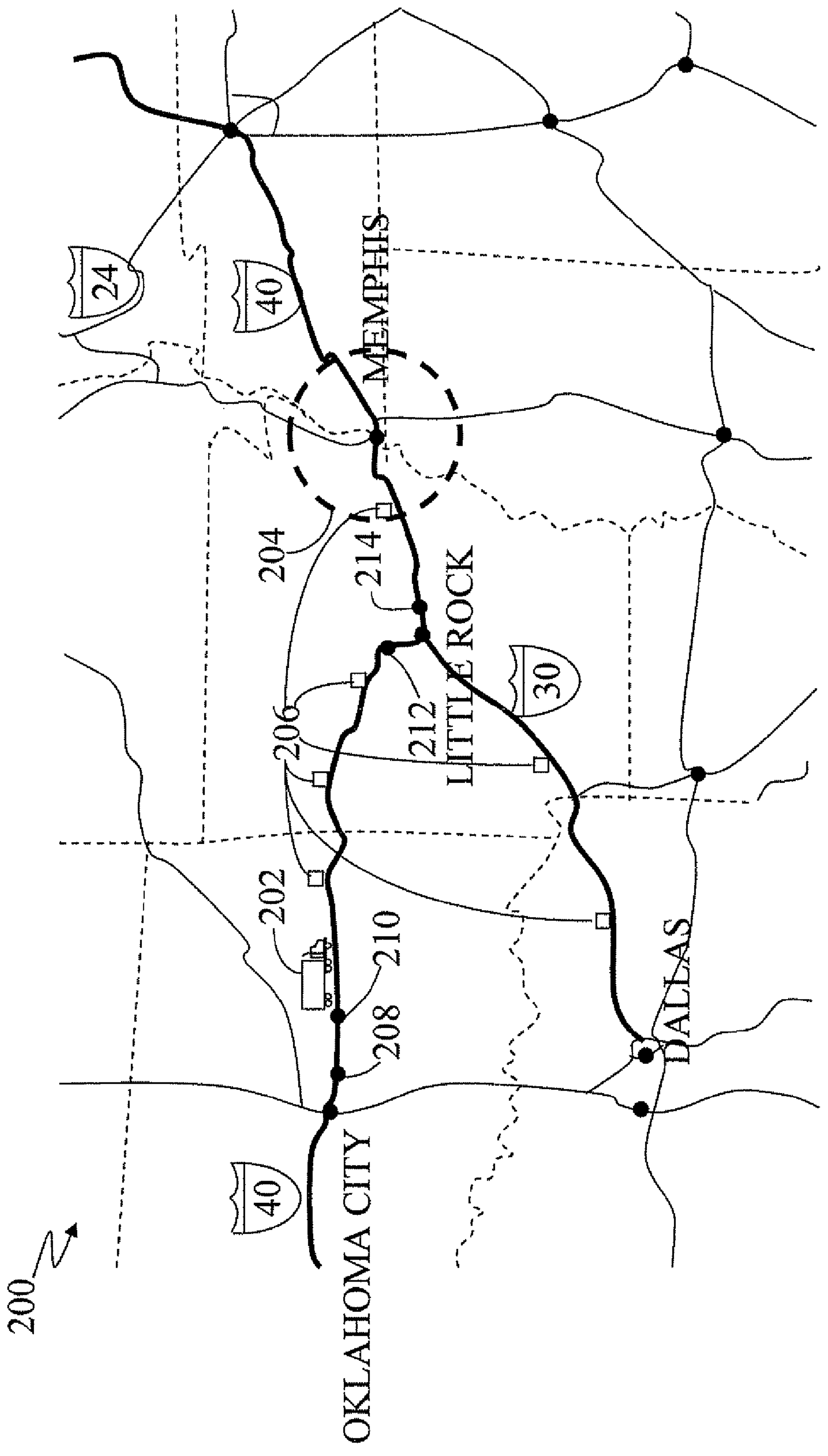
FIG. 2 illustrates a first example of a predictive geofence system operation.

FIG. 2 shows an example of a conveyance 202 of hazardous materials that is not desired to cross a geofence 204 of 60 miles around Memphis, Tenn. Conveyance 202 is currently traveling East on Interstate-40 (I40) and is heading toward an intersection where I40 turns left toward Memphis and Interstate-30 (I30) starts and goes West toward Dallas.

If client 106 is a shipping company that subscribes to services of predictive geofence platform 104 to track conveyance 202 as a target, predictive geofence platform 104 may send alerts to the shipping company and/or a designated alert monitor 108 if a predicted geofence crossing will occur. Predictive geofence platform 104 may receive, from the shipping company or other available sources, information relating to conveyance 202 such as contents, expected route, shipping schedule, etc. All the information associated with conveyance 202 may be store in a database. Predictive geofence platform 104 may track conveyance 202 through periodic reports from a GPRS/GPS tag mounted on conveyance 202, through reports from stationary reporting units 206 disposed along I30 and I40 and/or through other techniques such as satellite imaging, airplane surveillance, etc.

Predictive geofence platform 104 determines a future position of conveyance 202 based on current and historical information. For example, assume that the last 4 hourly reports for conveyance 202 indicate an average traveling speed of about 55 mile per hour (mph) along I40, and the current position indicates that conveyance 202 has traveled about 220 miles. A predicted position of conveyance 202 for a distance-horizon for 1 hour in the future is about 55 miles by dead reckoning (i.e., 1 hr*55 mph=55 miles). If the distance between the current position of conveyance 202 and geofence 204 along the expected route on I40 is greater than 55 miles, then an alert will not be generated. However, if conveyance 202 is less than 55 miles from geofence 204, then predictive geofence platform 104 will generate an alert and send the alert to client 106 and/or to any designated party specified by, client 106. Alerts may be sent periodically until conveyance 202 is not predicted to cross geofence 204. Client 106 may require the alert to be sent to an alert monitor 108 such as the Highway Patrol and/or the operator of conveyance 202, for example.

The dead reckoning discussed above utilizes map data to predict the distance that conveyance will travel along I40. However, if map data is not available, then a predicted distance along a line of sight in a direction of travel may be used. For example, the velocity of conveyance 202 may be represented by a vector having a magnitude equal to a speed of conveyance 202 and a direction determined by a position history.

If the position history is set to be the last 2 reported positions, then conveyance 202 has a velocity direction pointing to Memphis for positions 208 and 210. For positions 208 and 210, predictive geofence platform 104 will predict a straight line distance that conveyance 202 will travel toward Memphis. Thus, if a distance from conveyance 202 along a straight line containing positions 208 and 210 that is 55 miles long crosses geofence 204, then an alert will be generated to predict a geofence crossing. However, if positions 212 and 214 are the last 2 reported positions, then the velocity direction does not intersect geofence 204, and a geofence crossing will not be predicted even if a line connecting position 214 and Memphis is less than 55 miles.

In general, if a distance between two consecutive reported positions is short, the velocity direction may be very sensitive to small bends in a road. Thus, predictive geofence platform 104 may perform position history analysis to determine the appropriate processing of historical positions for generating a vector direction. For example, when a velocity direction continues to change erratically for a period of time, predictive geofence platform 104 may filter historical velocity directions to remove high frequency components to determine a general movement direction of conveyance 202. A filter may simply be averaging the velocity direction for a window of positions, where a number of positions in the window may be predetermined or adaptively adjusted based on a history of direction changes, geographical location, etc. For example, mountainous or metropolitan areas may have high frequency direction changes in short distances, but desert or less populated areas may have less direction changes.

The accuracy of the alert may be enhanced by improving the accuracy of the predicted distance. For example, the weight of conveyance 202 and characteristics of the traveled medium such as the terrain of the relevant portions of I40 may be taken into account. If the terrain has many turns or mountainous and/or the load carried by conveyance 202 is very heavy, then the traveling speed of conveyance 202 may be adjusted based on a table of coefficients obtained by prior experience, calculated based on weight, grade of the road, etc. For example, assume that the stretch of I40 between Oklahoma City and Little Rock is mountainous while the stretch between Little Rock and Memphis is generally flat. If the coefficient for the stretch between Oklahoma City and Little Rock is 0.8 (80% speed compared to straight and flat road), then the speed of conveyance 202 is 0.8 multiplied by the speed of a substantially straight and flat road. Since conveyance 202 was traveling at 55 mph between Oklahoma City and Little Rock, then the conveyance would travel at about 55/0.8 or 68.75 mph between Little Rock and Memphis if the coefficient along this stretch is 1. However, assuming that the speed limit is 65 mph between Little Rock and Memphis, the speed of conveyance 202 would be predicted to be at 65 mph along this stretch. If the history of conveyance 202 is to disregard the speed limit, then 68.75 mph may be used until data is obtained to confirm actual speed. Other adjustments may also be included such as weather conditions, traffic, and road construction, for example.

In the above discussion, the target is conveyance 202. However, the target may be geofence 204, client 106 may be DHS, and the designated party for receiving alerts may be the FBI as alert monitor 108, for example. In this case, predictive geofence platform 104 may receive information regarding all carriers for states surrounding Tennessee and then track only those carriers within a larger area encompassing geofence 204. For example, an area within a radius of 250 miles around Memphis could be used. Predictive geofence platform 104 may receive carrier information from an external source such as DHS, for example. Conveyances may include carriers on land, in the air and/or on the waterways, as may be appropriate for a target location. Predictive geofence platform 104 may filter the information for those identified conveyances that are carrying hazardous materials, for example.

Predictive geofence platform 104 tracks each identified conveyance within the larger area. When an identified conveyance is predicted to cross geofence 204 within a specified distance-horizon or have a time-horizon less than the set time, then the FBI is alerted so that possible preventive action may be taken. The alert may also be sent to the operator of the identified conveyance and or other alert monitors 108 such as the Highway Patrol, for example.

Figure 3:
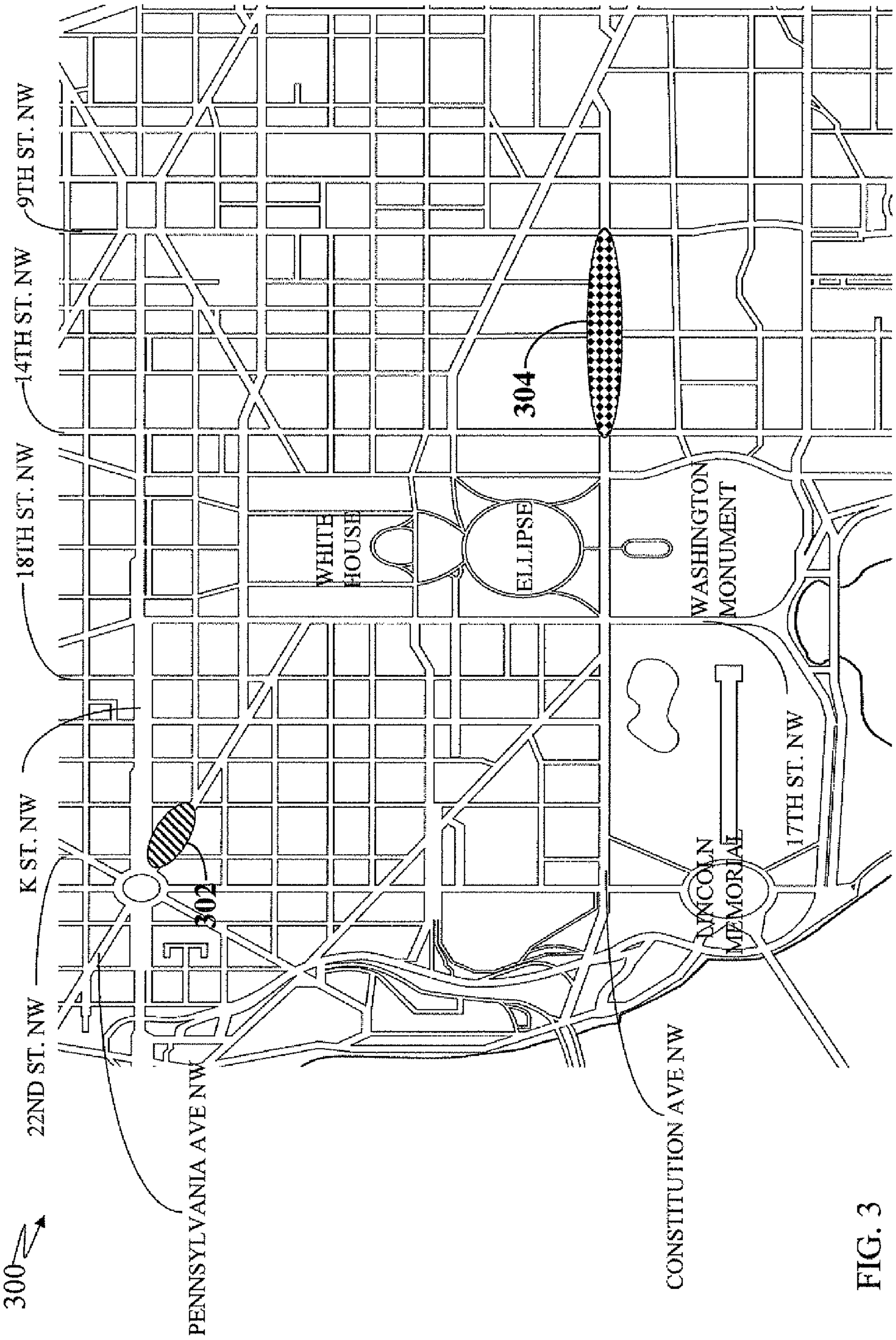
FIG. 3 illustrates a second example of a predictive geofence system operation.

FIG. 3 shows an operation of predictive geofence platform 104, where geofences 302 and 304 encompass two groups of people moving along respective planned routes in Washington D.C. For example, geofence 302 encompasses a group of anti-war activist moving along Pennsylvania Ave NW South-East toward the White House. Geofence 304 encompasses a patriotic parade marching West on Constitution Ave NW toward the Lincoln Memorial. The Capital Police wants to make sure that the two potentially conflicting groups do not come within 2 blocks of each other to prevent any violent interactions.

The Capital Police has assigned personnel that move along perimeters of each group. Capital Police officers may carry a position reporting device such as a GPS enabled cell phone, for example, that periodically reports its position to predictive geofence platform 104 through network 102. Based on the periodic reports, predictive geofence platform 104 generates geofences 302 and 304, which are contours of outer perimeters of each of the crowds of people. Based on a history of geofences 302 and 304, predictive geofence platform 104 may predict distance- and/or time-horizons of geofences 302 and 304.

Unlike geofence 204 that is fixed around Memphis, geofences 302 and 304 are dynamic because they move and their shapes change. One way of characterizing the movements of geofences 302 and 304 may be in terms of the movements of their respective centroids.

Figure 4:
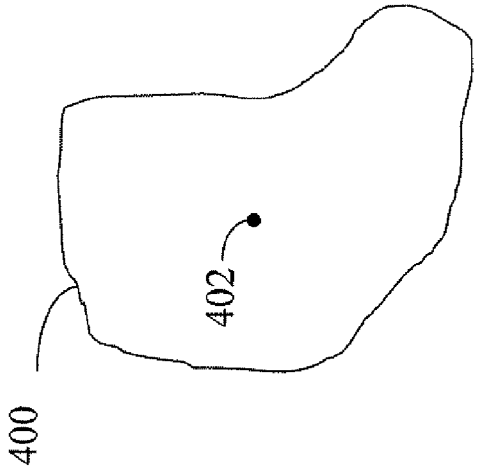
FIG. 4 illustrates an example of a geofence with a centroid.

Centroids of 2 dimensional geofences may be generated based on area moments. FIG. 4 shows an example geofence 400 having a centroid 402. Coordinates of centroid 402 $X_c$, $Y_c$ may be determined by using area moments $M_x$ and $M_y$. $X_c=(1/A)\Sigma M_x$ for all x, and $Y_x=(1/A)\Sigma M_y$ for all y, where A is the area of geofence 400, $a_x$ is an area of a vertical slice of the geofence at x, and $a_y$ is an area of a horizontal slice of geofence 400 at y.

Figure 5:
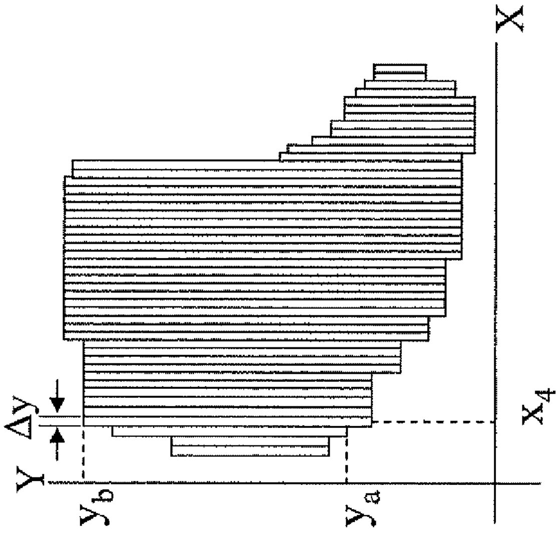
FIG. 5; illustrates X-axis area moments of the geofence of FIG. 4.
Figure 6:
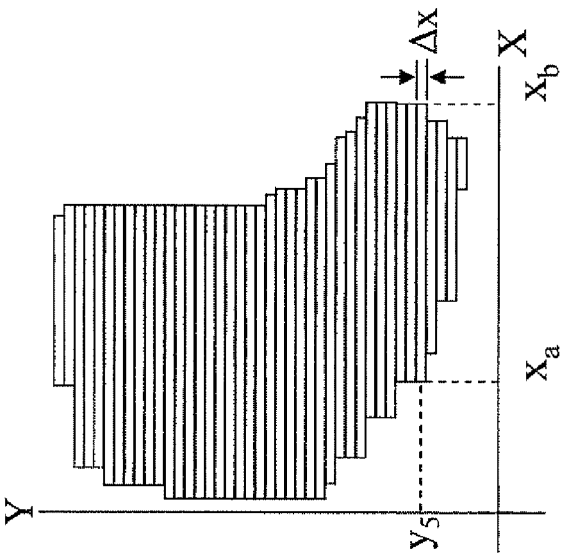
FIG. 6 illustrates Y-axis area moments of the geofence of FIG. 4.

FIGS. 5 and 6 show geofence 400 sliced up vertically and horizontally, respectively. In FIG. 5, vertically sliced geofence 500 is divided into rectangles Δy wide. The length of each rectangle is determined by a perimeter of geofence 400 for a particular x coordinate. For $x_4$, the length of the corresponding rectangle is $y_b-y_a$. Thus, the area of the slice corresponding to $x_4$ is $\Delta y*(y_b-y_a)$, and the area moment $M_x$ at $x_4$ is $x_4*\Delta y*(y_b-y_a)$. Following the same procedure, $M_y$ at $y_5$ is $y_5*\Delta x*(x_b-x_a)$. If all $M_x$ are summed and the sum divided by A, the area of geofence 400, the result is $X_c$, the x coordinate of centroid 402. Similarly, if all $M_y$ are summed and the sum divided by A, the result is $Y_c$, the y coordinate of centroid 402.

Figure 7:
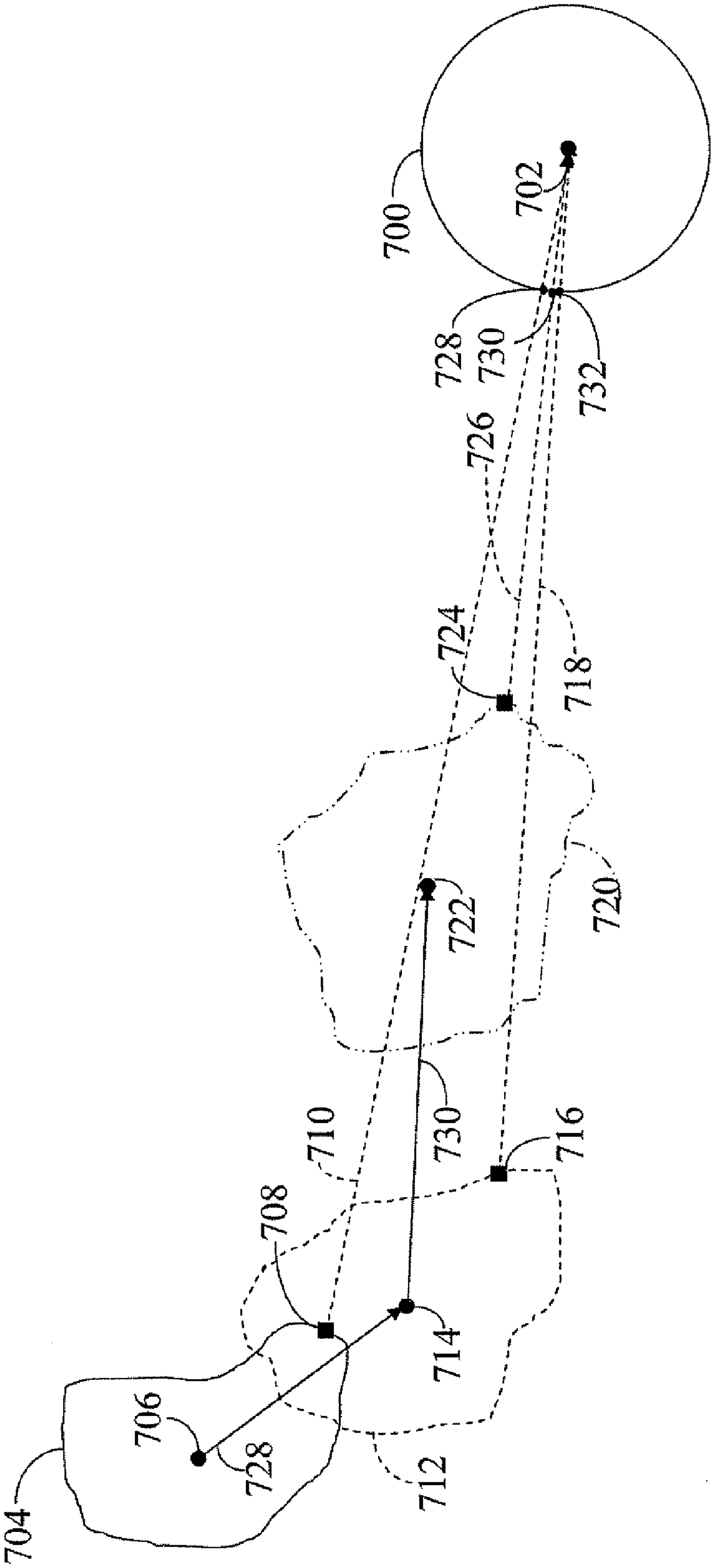
FIG. 7 illustrates an example of a moving geofence.

FIG. 7 shows an example of a geofence 700 that has a centroid 702 and a geofence 704 morphing into geofences 712 and 720 moving toward geofence 700. Geofences 704, 712 and 720 may represent people traveling on foot, for example. Arrows 728 and 730 between successive centroids 706, 714 and 722 may characterize the movements of the sequence of geofences 704, 712 and 720. Thus, a movement speed and direction of successive geofences 704, 712 and 720 may be generated based on centroid movements. For example, if arrow 728 has a length of 1 mile and the time elapsed between geofences 704 and 712 is 10 minutes, then geofence 704 moved to geofence 712 at a speed of (1 mile/12 minutes)*60 minutes per hour=5 mph.

If geofences 704, 712 and 720 are progressing along a path such as a roadway, then predictive geofence platform 104 may predict a crossing for a time or distance horizon based on the path. For example, based on the speed and distance corresponding to arrow 728, predictive geofence platform 104 may predict the location of centroid 714 by dead reckoning. As discussed earlier in connection with conveyance 202, the prediction may incorporate conditions of the traveled medium such as terrain, resistance (e.g., density of other people not part of the geofence that are also on the path), etc. If no recognizable path is present, then a line of sight may be used to calculate distance as modified by medium characteristics such as rocky areas, water, etc. that may be accounted for in a predicted travel path.

Predictive geofence platform 104 may use points of geofences nearest to each other to determine a geofence crossing. In FIG. 7, points 708, 716 and 724 of geofences 704, 712 and 720, respectively, are nearest to geofence 700 at points 728, 732 and 730, respectively. To determine a geofence crossing between geofences 700 and 712, the distance between point 716 of geofence 712 and point 732 of geofence 700 may be used as a remaining distance R of separation. If geofences 704 and 712 are progressing down a road, prediction of point 716 for a distance-horizon D may be obtained by dead reckoning using the speed of centroid 706 multiplied by T time in the future to obtained a distance D that point 716 will progress down the road. If D is greater than R, then a geofence crossing is predicted to occur and an alert is generated.

Instead of using the speed of the centroid, the speed calculated by dividing the distance between nearest points 708 and 716 by an elapsed time for geofence 704 to morph into geofence 712 may be used. Other methods may also be used based on measured accuracy for specific circumstances. For example, possible estimated movement speed may be:

1. the average movement of 10% of an area of geofence 712 closest to geofence 700;
2. the speed of centroid 714 increased by a speed that point 716 is moving away from centroid 714. This may be calculated by subtracting the distance between point 708 and centroid 706 from the distance between point 716 and centroid 714 and dividing the result by the elapsed time; and/or 3. the speed of centroid 714 increased by an average expansion rate calculated based on changes between geofences 704 and 712 and their respective centroids.

Geofence 700 may also be dynamic and morph. In this case, predicting a geofence crossing also requires determining a movement and change of shape of geofence 700 similar to the discussion above in connection to successive geofences 704, 712 and 720. A geo fence crossing may then be predicted using the methods discussed above based on the nearest points between the geofences 700 and 704, 712 or 720.

FIG. 8 shows an example of contents of a database 800 that stores information used by predictive geofence platform 104. For example Oracle® Spatial (Oracle) may be such a database that is suited to store spatial information such as position, terrain characteristics, etc. Additionally, Oracle performs many functions relating to perimeters such as a geofence. For example, Oracle may be commanded to perform changes in position or shape which may be used for geofence updates. Further, Oracle may determine closest points of two perimeters, distances between two perimeters, perimeter crossings, etc. These functions may be used effectively by predictive geofence platform 104 to predict geo fence crossings.

The first column identifies a target such as conveyance 202 in the first row, for example. The second column identifies contents of interest of the target. As noted earlier, conveyance content may be obtained from the shipping company, etc. For conveyance 202, its cargo contains hazardous materials (HAZMAT). For parade 5 in the third row, there is no carrier and the content is the activists who are part of parade 5.

The third column indicates what predictive geofence platform 104 is tasked to do in connection with the target. For conveyance 202, predictive geofence platform 104 is tasked to generate an alert for potential relevant geofence crossing of conveyance 202. In this case, the geofences of interest are normally spatially fixed such as cities and residential neighborhoods, etc. However, for Hijack FT 325 in row 2, the task is National Security 1 that may require fast changes resulting in more dynamic variations depending on development of a crisis situation. Thus, the task assigned to predictive geofence platform 104 may change based on prior alerts, and database contents may be updated on a frequent basis.

The fourth column stores spatial information associated with the target. The spatial information may include latitude and longitude that identify the position of a target such as conveyance 202. For other targets such as parade 5 in row 3, the spatial information is geofence 1 that is constantly updated as parade 5 proceeds. The last column indicates the parties to be alerted when a predicted geofence crossing occurs. Some alerts may be simply sending an alert message to a single party such as the police in row 4 in connection with demonstrations 2, 3 and 4. Here, the police department may wish to keep demonstrators from interacting with each other. Other columns may be added such as task termination time, for example, or deleted as appropriate.

Alerts may be more complex and may involve logical processes depending on specific circumstances. For example, for row 7, the target is Memphis, a current position of conveyance 202 is about 90 miles before reaching Little Rock, and the distance between Little Rock and geofence 204 is about 66 miles. Thus, conveyance 202 is predicted to be about 3 hours away from crossing geofence 204 assuming a speed of about 55 mph. Conveyance 202 turns left toward Memphis at Little Rock and increases its speed to much higher than the speed limit. In this case, alert 20 may include logic that identifies this potentially dangerous situation and alerts the FBI, DHS, Memphis security and emergency Hazmat teams in the Memphis area. If, on the other hand, conveyance 202 turns toward Memphis, but slows down or comes to a standstill, then alert 20 may only direct an alert to the Highway Patrol for visual contact, for example. Perhaps conveyance 202 simply made a wrong turn and is confused regarding the planned route that avoids Memphis.

In rows 5 and 6, the targets are tracked for entirely different purposes from security concerns discussed above. Here, conveyance 576 and conveyance 267 are delivering toys and lawn tractors for a retail outlet. The receiving department is provided alerts for arrival of shipped items for scheduling work crews at receiving and/or for providing merchandize availability to customers. The geofence is the location of the receiving dock, and the set time is 8 hours that accounts for scheduled down times when conveyance operators (e.g., truck drivers) take breaks, for example. Thus, predictive geofence platform 104 will send alert emails to the retail outlet that includes time-to-crossings (here it is the same as time-of-arrivals) for conveyance 576 and conveyance 267 when these times are less than the set time of 8 hours. Each day, based on received alert emails, the retail store can plan receiving activities for the next day, and customers may be contacted for the arrival of their ordered items.

Row N has Air Force 1 as a target and the President is the content. Geofence 0 may be a sphere of 60 miles and a distance-horizon for 1 hour in a 30 degree cone in the direction of flight, 15 minutes in a 30 degree cone in the opposite direction, and 30 minutes in all other directions. Predictive geofence platform 104 may be tasked with generating alerts for any unauthorized objects that is within the specified distance-horizon of geofence 0. Alert 0 may include various other political leaders, the Pentagon, etc.

Figure 9:
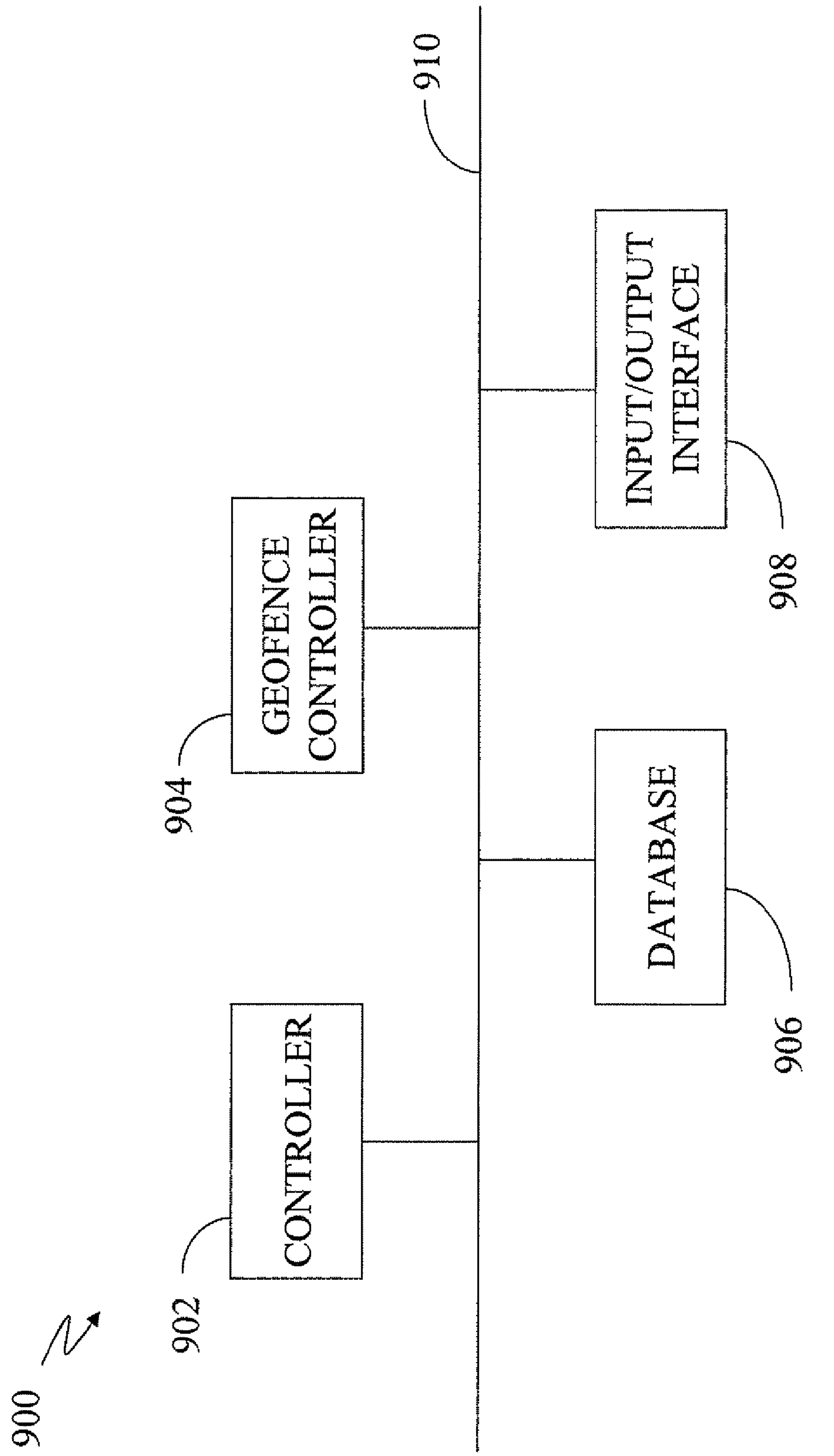
FIG. 9 illustrates an example block diagram of a predictive geofence platform.

FIG. 9 shows and exemplary block diagram 900 of predictive geofence platform 104 that includes a controller 902, a geofence controller 904, a database 906 and in input/output interface 908. Although controller 902 and geofence controller 904 may be CPUs such as microcomputers and are illustrated as separate components for ease of discussion, the functions of these controllers 902 and 904 may be combined and performed by only controller 902, for example. Also, the functions performed by controller 902 and geofence controller 904 may be further divided into functions performed by additional controllers as may be appropriate. Components 902-908 are coupled together by signal bus 910. FIG. 9 shows a bus architecture as an example for convenience of discussion. Other architectures may be used as dictated by specific circumstances.

As noted earlier, database 906 may be Oracle that serves as a repository of information received from external sources through input/output interface 908. Additionally, Oracle may commanded by geofence controller 904 to perform many of geofence management functions discussed above such as maintaining geofence perimeter definitions as the perimeter changes, determine centroids of geofences, and/or determining a geofence crossing based on a movement distance, for example. The information may include target identification, contents of the target, tasks to be performed including specification of distance- or time-horizons, spatial information in connection with the target including position, velocity, acceleration, altitude if applicable, medium characteristics, etc. Database 906 may also include specified alerts including any logic, an inference engine and/or artificial neural network (ANN) programs associated with generating sophisticated alert algorithms as may be specified by clients 106 and performed by geofence controller 904.

When information is received through input/output interface 908, controller 902 may direct the information to be appropriately stored in database 906. Controller 902 determines the relevance of the received information and identifies appropriate targets that are affected and take appropriate action. If the new information is new instructions for defining new geofences, for example, controller 902 directs geofence controller 904 to perform the processing necessary to form the new geofences. If a new target is identified, then controller 902 directs database 906 to establish required new entries and store information associated with the new targets including any spatial information that may have been received.

If new spatial information is received, controller 902 may add to a work queue of geofence controller 904 to process the new spatial information. For example, if new spatial information is received in connection with conveyance 202, geofence controller 904 retrieves historical information associated with conveyance 202 and determines the road that conveyance 202 is traveling based on map data. Geofence controller 904 may also determine the velocity and/or acceleration of conveyance 202, predict distance and/or time-to-crossing, and any predicted geofence crossings. Geofence controller 904 may forward processing results to controller 902 for alert processing.

Upon receiving the processing results, controller 902 may execute alert processing programs such as inference engines, ANN, etc. that may be specified by clients 106. If warranted, alerts are sent through input/output interface 908 such as email, voice mail, facsimile, alarms, etc. to one or more parties designated by clients 106. If alert processing is simply retrieving a contact list and sending emails, then controller 902 performs the list retrieval and sends the appropriate emails through input/output interface 908.

Figure 10:
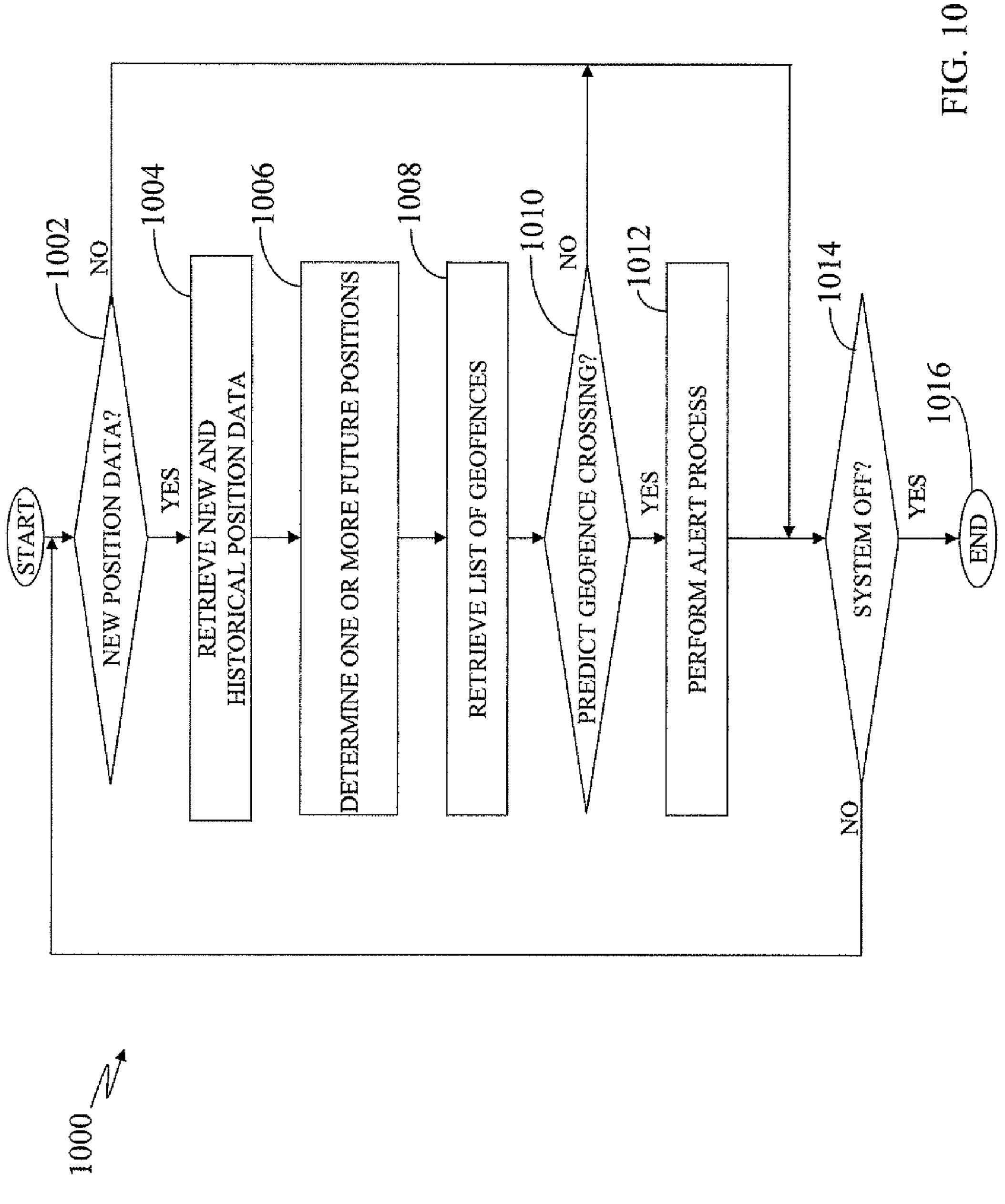
FIG. 10 is an exemplary flowchart of a geofence crossing prediction process for a target and a stationary geofence.

The processes discussed below in FIGS. 10-12 may be performed by controller 902, geofence controller 904, and/or other added controllers as may be determined for a specific circumstance. FIG. 10 shows an exemplary flowchart 1000 of the predictive geofence platform 104 for a moving target such as conveyance 202 and a stationary geofence such as geofence 204 around Memphis. In step 1002, the process determines if new position data is available. If new data is available, the process goes to step 1004. Otherwise, the process returns to step 1014. In step 1004, the process retrieves new and historical data from database 906, for example, and goes to step 1006.

In step 1006, the process determines one or more future positions or times-of-crossing based distance- or time-horizons and the set time, and goes to step 1008. For example, the process may calculate the speed of the target based on an average distance traveled so far and divide the average distance by the elapsed time. The process can then apply dead reckoning and multiply the speed of the target such as conveyance 202 by the time to get a predicted distance, or in later step 1010, divide the distance to a geofence by the speed of the target to obtain the time-to-crossing. Additionally, the process may adjust the speed calculation to account for the weight of the object and medium characteristics such as the terrain if a land carrier is the target, head or tail winds for an air carrier or water currents for a water carrier. Other adjustments may be applied as appropriate such as traffic conditions, time of day (daylight vs. nighttime), etc.

Further, dead reckoning may be performed with or without map data. If map data is available, then the predicted distance-/time-horizon may be generated based on distance traveled along a known road corresponding to the position of a conveyance. If map data is not available, then historical positions may be used to determine a vector direction, and the predicted distance-/time-horizon may be based on straight line in the vector direction.

In step 1008, the process retrieves a list of geofences that should be considered for geofence crossings, and the process goes to step 1010. This list may be provided by the client 106, government agencies such as the DHS, FBI, etc. or other sources such as companies that specializes in collection of data relevant for geofence identification. In step 1010, the process determines if a geofence crossing is predicted to occur based on the predicted distance or time-to-crossing. If a geofence crossing is predicted to occur, then the process goes to step 1012. Otherwise, the process goes to step 1014.

In step 1012, the process performs alert processing to generate appropriate alerts, and the process goes to step 1014. In step 1014, the process determines if the system is off. If the system is off, the process goes to step 1018 and ends. Otherwise, the process returns to step 1002.

Figure 11:
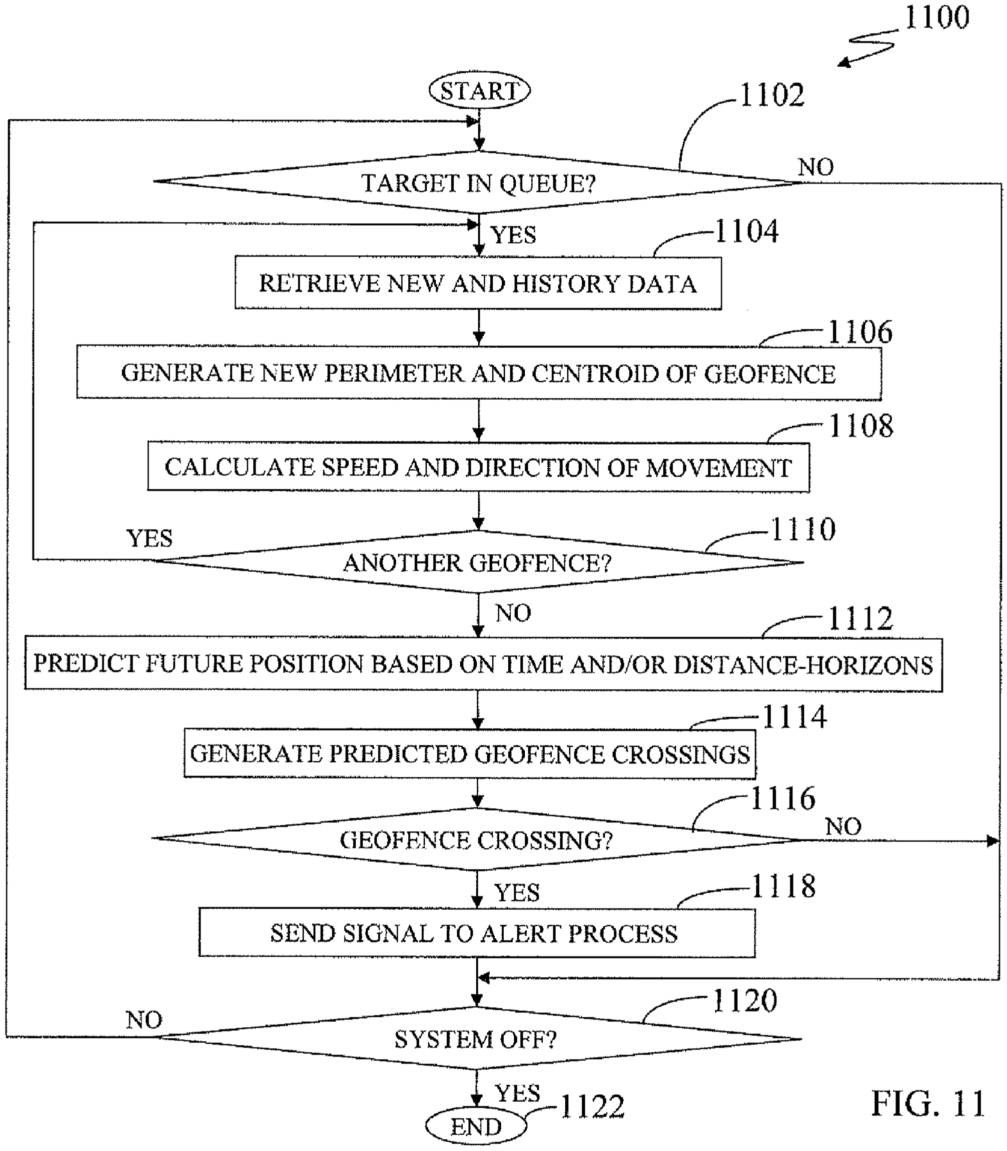
FIG. 11 is an exemplary flowchart of a geofence crossing prediction process for moving geo fences.

FIG. 11 shows an exemplary flowchart of a geofence process for dynamic geofences. The geofence process may include a queue and sequentially processes geofences starting with a top geofence in the queue, for example. In step 1102, the process checks if a target is in the queue. If a target is in the queue, the process goes to step 1104. Otherwise, the process goes to step 1120. In step 1104, the process retrieves new and historical data for the top geofence from database 906, for example, and goes to step 1106. In step 1106, the process generates a new perimeter and centroid for the geofence, and goes to step 1108. As discussed, the centroid may be generated by summing area moments and then dividing the area moments by the area encompassed by the new perimeter. Centroids may be determined by Oracle, for example.

In step 1108, the process calculates the speed and direction of movement of the geofence, and goes to step 1110. Depending on the circumstances, the speed and direction of the centroid may be used to represent the movement of the geofence. If this is the case, then a history of the positions and movements of past centroids may be used to determine the movement of the centroid. If the centroid is generally moving along a path, then only the speed is needed. Otherwise, a centroid movement direction may be needed to predict a future position of the geofence. For example, if whales are tracked by satellite images, then a direction of movement of the centroid would be helpful in predicting where the whales may be going. A prediction by dead reckoning may be to average the last 5 miles of movement vectors and predicting the future based on the average, for example.

In step 1110, the process checks if there is another geofence to be processed in connection with the current target. For example, the target may be more than one dynamic geofence. If another geofence is to be processed, the process returns to step 1104. Otherwise, the process goes to step 1112. In step 1112, the process predicts the future positions and/or times-of-crossing based on time- and/or distance-horizons, and goes to step 1114. If the geofences are moving along known paths such as roadways or trails, then speeds of centroids may be used as a substitute for the movement of the geofence. However, when the distance separating nearest points of two potentially crossing geofences is less than a threshold distance, the nearest points of each of the geofences could be used. As discussed earlier, other techniques for estimating the speed of movements may be used. For example, calculating the speed of the 10% of the geofence area nearest to other geofences that may be crossed, calculating the speed of the centroid and adding an average geofence expansion speed, etc.

In step 1114, the process predicts whether a geofence crossing will occur, and the process goes to step 1116. A geofence crossing occurs if predicted future perimeter portions of geofences touch or overlap. In step 1116, if a geofence crossing is predicted to occur, the process goes to step 1118. Otherwise, the process goes to step 1120. In step 1118, the process sends a signal to an alert process to determine if an alert is to be generated, and the process goes to step 1120. In step 1120, the process determines if the system is off. If the system is off, the process goes to 1122 and ends. Otherwise, the process returns to step 1102.

Figure 12:
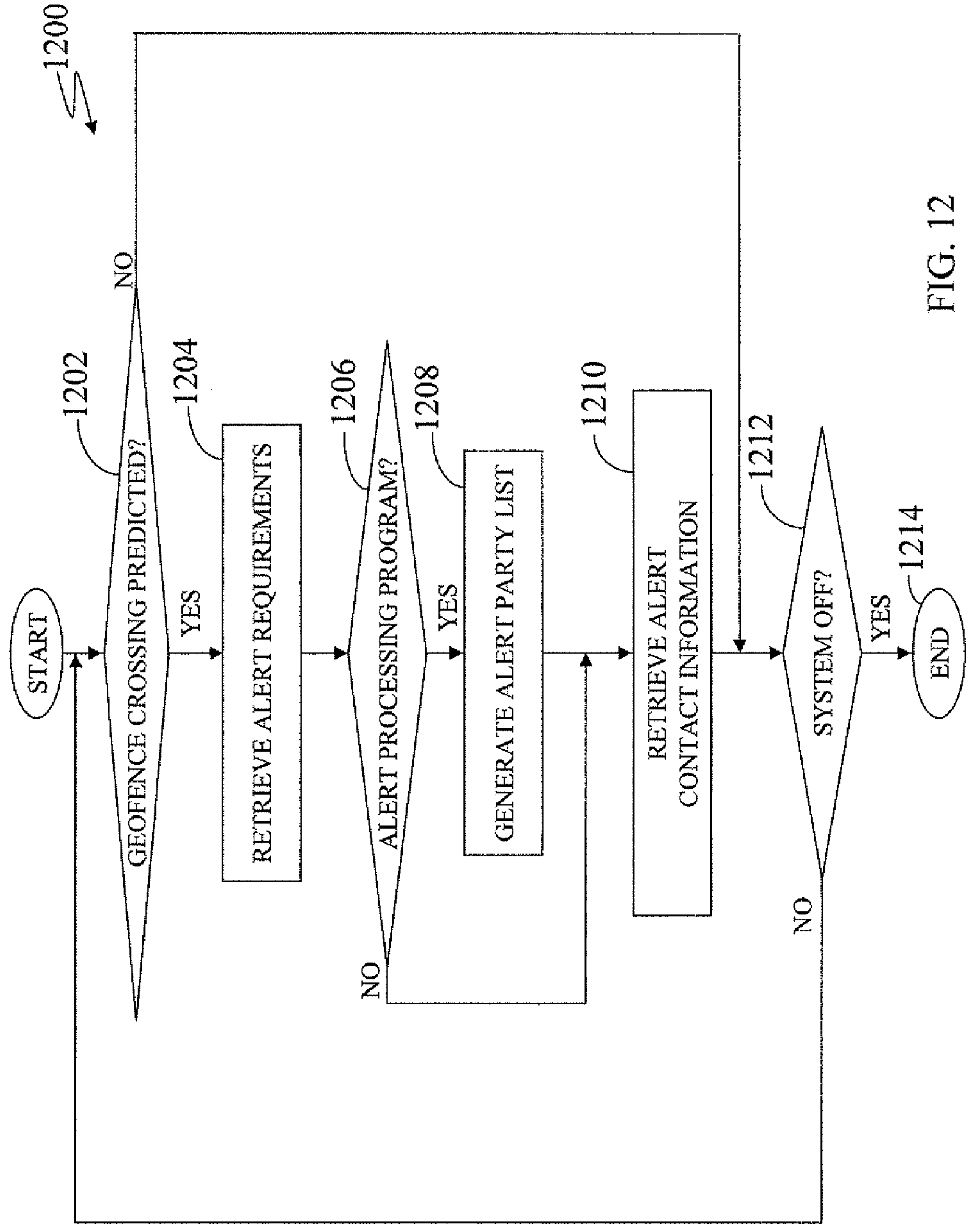
FIG. 12 is an exemplary flowchart of an alert process.

FIG. 12 shows an exemplary flowchart 1200 for an alert process. In step 1202, the process checks if a geofence crossing is predicted. If a geofence crossing is predicted, the process goes to step 1204. Otherwise, the process goes to step 1212. In step 1204, the process retrieves alert requirements, and goes to step 1206. If the alert requirements specifies that alerts should be generated based on a program such as an inference engine or an ANN, then the process goes to step 1208. Otherwise, one or more parties to be alerted are already identified in the requirement and the process goes to step 1210. In step 1208, the process executes the required program to generate the parties that should be alerted, and goes to step 1210. In step 1210, the process retrieves contact information for the parties to be alerted, outputs the alerts, and goes to step 1212. In step 1212, the process checks if the system is off. If the system is off, the process goes to step 1214 and ends. Otherwise, the process returns to step 1202.

Although the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A predictive geofence alert apparatus comprising:

an input device that receives first data of a first object;

a database that stores the first data; and a controller coupled to the input device and the database, based on the first data, the controller predicting a future position of the first object or a time-to-crossing of the first object to a first geofence using dead reckoning and a characteristic of the medium traversed by the first object, and generating an alert if the future position of the first object crosses the first geofence or the time-to-crossing is less than a set time.

2. The apparatus of claim 1 wherein based on the first data, the controller generates a second geofence for the first object, the controller generating the alert if the second geofence is predicted to cross the first geofence or if the second geofence is predicted to cross the first geofence in less than the set time.

3. The apparatus of claim 2 wherein the input device receives second data and the database stores the second data, and based on the second data, the controller generates a new first geofence, the controller generating the alert if the second geofence is predicted to cross the new first geofence or the second geofence is predicted to cross the new first geofence in less than the set time.

4. The apparatus of claim 2, wherein a crossing between the first and second geofences is determined based on one or more of:

a centroid of the first geofence and/or a centroid of the second geofence, and points on the first and/or second geofences.

5. The apparatus of claim 1 wherein the first geofence is a position of a second object, the controller generating the alert that includes a time-to-crossing of the first object to the position of the second object.

6. The apparatus of claim 1 wherein the first geofence is in motion, the controller predicting a distance between the first object and the first geofence based on a distance-horizon and/or predicting a time-to-crossing when the first object crosses the first geofence.

7. The apparatus of claim 6, wherein the distance-horizon and/or the set time of the time-horizon have different values based on the future position of the first object and a direction of motion of the first geofence.

8. The apparatus of claim 1 wherein the controller generates the alert based on one or more of:

a list of one or more parties to be contacted, a logical formula, an inference engine and/or an artificial neural network directing one or more parties to be contacted based on circumstances associated with the first object and the first geofence.

9. A method for generating a predictive geofence alert comprising:

receiving first data of a first device;

storing the first data in a database;

predicting a future position of the first object or a time-to-crossing of the first object to a first geofence based on dead reckoning and a characteristic of a medium traversed by the first object; and generating an alert if the future position of the first object crosses the first geofence or the time-to-crossing of the first geofence is less than a set time.

10. The method of claim 9 further comprising:

generating a second geofence for the first object; and generating the alert if the second geofence is predicted to cross the first geofence or if the second geofence is predicted to cross the first geofence in less than the set time.

11. The method of claim 10 further comprising:

receiving second data;

storing second data in the database;

generating a new first geofence based on the second data;

generating the alert if the second geofence is predicted to cross the new first geofence or the second geofence is predicted to cross the new first geofence in less than the set time.

12. The method of claim 10 further comprising:

generating a centroid for the first geofence;

generating a centroid for the second geofence; and determining a crossing between the first and second geofences based on one or more of the first and second centroids and/or points on the first and second geofences.

13. The method of claim 9 wherein the first geofence is a position of a second object, the method further comprising generating an alert that includes a time-to-crossing for the first object to the position of the second object.

14. The method of claim 9 wherein the first geofence is moving, the method further comprising one or more of predicting a distance between the first object and the first geofence, and predicting a time-to-crossing when the first object is predicted to cross the first geofence.

15. The method of claim 14 wherein the distance-horizon and/or the set time of the time-horizon have different values based on the future position of the first object and a direction of motion of the first geofence.

16. The method of claim 9 wherein the generating the alert comprises one or more of:

transmitting an alert to a list of one or more parties to be contacted, and transmitting an alert to one or more parties to be contacted as directed by a logical formula, an inference engine and/or an artificial neural network based on circumstances associated with the first object and the first geofence.

17. A predictive geofence alert system comprising:

a client that identifies a target and a geofence task to be performed;

an alert monitor that receives an alert of a geofence crossing; and the predictive geofence alert apparatus of claim 1.

* * * * *